US008804195B2

(12) United States Patent  (10) Patent No.: US 8,804,195 B2
Nishikawa  (45) Date of Patent: Aug. 12, 2014

(54) INFORMATION PROCESSING APPARATUS, INFORMATION PROCESSING METHOD, AND COLOR SEPARATION TABLE GENERATION METHOD FOR OUTPUTTING AN IMAGE USED FOR DETERMINING THE ACCEPTABLE COLORANT AMOUNT OF A PRINT MEDIUM

(75) Inventor: Hiromitsu Nishikawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 922 days.

(21) Appl. No.: 11/835,056

(22) Filed: Aug. 7, 2007

(65) Prior Publication Data

US 2008/0037046 A1   Feb. 14, 2008

(30) Foreign Application Priority Data

Aug. 8, 2006 (JP) ................. 2006-215857
Nov. 30, 2006 (JP) ................. 2006-324481

(51) Int. Cl.
*G06K 15/00* (2006.01)

(52) U.S. Cl.
USPC ............ 358/2.1; 358/1.9; 358/3.27; 358/504; 347/15; 347/19; 347/106

(58) Field of Classification Search
USPC .............. 358/1.9, 2.1, 3.27, 504; 347/14, 15, 347/105, 106, 19
See application file for complete search history.

(56) References Cited

U.S. PATENT DOCUMENTS 6,204,873 B1 * 3/2001 Shimazaki .................... 347/172
6,587,223 B1   7/2003 Yamaguchi
6,853,815 B2   2/2005 Tezuka et al.
2004/0021885 A1 * 2/2004 Nishikawa ..................... 358/1.9
2004/0027406 A1 * 2/2004 Nishikawa et al. ............ 347/19
2005/0024399 A1 * 2/2005 Fukuda et al. .................. 347/9
2005/0024660 A1 * 2/2005 Takahashi ..................... 358/1.9
2005/0219283 A1 * 10/2005 Kachi ............................. 347/6
2005/0243337 A1   11/2005 Kuhn et al.
2006/0221365 A1   10/2006 Watanabe

FOREIGN PATENT DOCUMENTS

| EP | 1152597 A2 | 11/2001 |
|---|---|---|
| EP | 1168822 A2 | 1/2002 |
| EP | 1311113 A2 | 5/2003 |
| EP | 1365579 | 11/2003 |
| EP | 1398951 | 3/2004 |
| JP | 04-299370 A | 10/1992 |
| JP | 2001-260407 A | 9/2001 |
| JP | 2001-270139 A | 10/2001 |
| JP | 2002-148890 A | 5/2002 |
| JP | 2002-321396 A | 11/2002 |
| JP | 2003-334934 A | 11/2003 |
| JP | 2003-338938 A | 11/2003 |
| JP | 2005-027094 A | 1/2005 |
| JP | 2005-107281 A | 4/2005 |
| JP | 2005-184401 A | 7/2005 |
| JP | 2005-313633 A | 11/2005 |
| JP | 2006-044039 A | 2/2006 |
| JP | 2006-159602 A | 6/2006 |
| KR | 2003-0022711 A | 3/2003 |

* cited by examiner

*Primary Examiner* — Jamares Q Washington
(74) *Attorney, Agent, or Firm* — Canon USA Inc IP Division

(57) ABSTRACT

An information processing method according to an aspect of the present invention includes an attribute acquisition step of acquiring an attribute of a print medium, a reference information acquisition step of acquiring reference information corresponding to the attribute of the print medium, and an image outputting step of outputting a plurality of images having different total colorant amounts on the basis of the reference information.

15 Claims, 15 Drawing Sheets

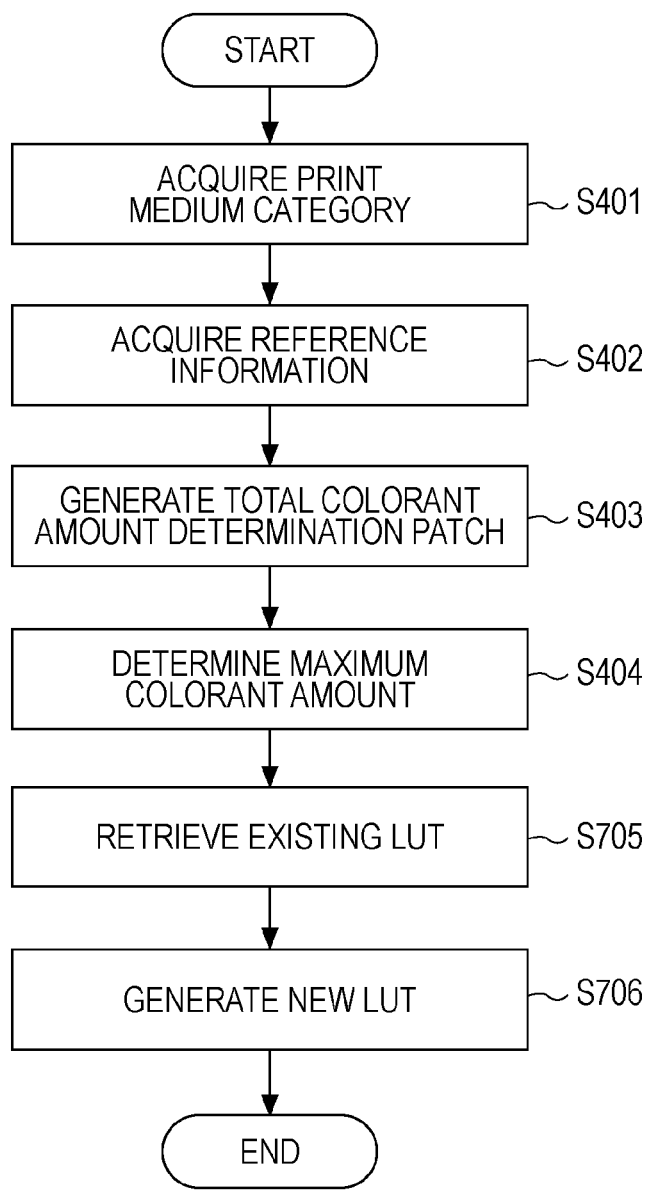

FIG. 8

| TOTAL COLORANT AMOUNT | EXISTING LUT |
|---|---|
| 180 | ABSENCE |
| 200 | PRESENCE |
| 220 | PRESENCE |
| 240 | PRESENCE |
| 260 | ABSENCE |

FIG. 9

| TOTAL COLORANT AMOUNT | EXISTING LUT GLOSSY PAPER | EXISTING LUT SEMI-GLOSSY PAPER | EXISTING LUT ART PAPER | EXISTING LUT COATED PAPER | EXISTING LUT NORMAL PAPER |
|---|---|---|---|---|---|
| 180 | ABSENCE | ABSENCE | ABSENCE | ABSENCE | PRESENCE |
| 200 | PRESENCE | PRESENCE | ABSENCE | ABSENCE | PRESENCE |
| 220 | PRESENCE | PRESENCE | PRESENCE | ABSENCE | ABSENCE |
| 240 | PRESENCE | PRESENCE | PRESENCE | PRESENCE | ABSENCE |
| 260 | ABSENCE | ABSENCE | PRESENCE | PRESENCE | ABSENCE |

| TOTAL COLORANT AMOUNT | EXISTING LUT |
|---|---|
| 180 | ABSENCE |
| 200 | PRESENCE |
| 220 | PRESENCE |
| 240 | PRESENCE |
| 260 | ABSENCE |

FIG. 23

| TOTAL COLORANT AMOUNT | EXISTING LUT GLOSSY PAPER | EXISTING LUT SEMI-GLOSSY PAPER | EXISTING LUT ART PAPER | EXISTING LUT COATED PAPER | EXISTING LUT NORMAL PAPER |
|---|---|---|---|---|---|
| 180 | ABSENCE | ABSENCE | ABSENCE | ABSENCE | PRESENCE |
| 200 | PRESENCE | PRESENCE | ABSENCE | ABSENCE | PRESENCE |
| 220 | PRESENCE | PRESENCE | PRESENCE | ABSENCE | ABSENCE |
| 240 | PRESENCE | PRESENCE | PRESENCE | PRESENCE | ABSENCE |
| 260 | ABSENCE | ABSENCE | PRESENCE | PRESENCE | ABSENCE |

INFORMATION PROCESSING APPARATUS, INFORMATION PROCESSING METHOD, AND COLOR SEPARATION TABLE GENERATION METHOD FOR OUTPUTTING AN IMAGE USED FOR DETERMINING THE ACCEPTABLE COLORANT AMOUNT OF A PRINT MEDIUM

BACKGROUND OF THE INVENTION

1. Field of the Invention

The present invention relates to an information processing apparatus, an information processing method, a program, and a recording medium recording the program and readable by the information processing apparatus, and more particularly, to an information processing technique for outputting an image used for determining the acceptable colorant amount of a print medium. In addition, the present invention relates to a color separation table generation method and an information processing apparatus, and more particularly, to a technique for generating a color separation table used for converting an image signal into a signal representing the amount of a colorant, such as ink, in association with a recording medium used for recording.

2. Description of the Related Art

Generally, a color separation table (lookup table (LUT)) is used in processing for converting a color signal representing image data into a color signal representing a colorant, such as ink or toner, used in a recording apparatus, such as a color printer. In the color separation table, for example, ink values (ink amounts) of yellow (Y), magenta (M), cyan (C), and black (K), which are color signals representing ink, are stored as grid point data at grid points defined by the values of R, G, and B color signals.

In a method for generating a color separation table, a cube constituted by grid points in an RGB color space is divided into six tetrahedrons each having four apexes from among the apexes of the cube. Ink amounts (grid point data) of grid points on sides forming each of the four triangles constituting each of the tetrahedrons are defined in advance. Then, the ink amounts corresponding to grid points inside each of the tetrahedrons other than the grid points on the sides are calculated by interpolation using the ink amounts corresponding to the grid points on the sides. In general, when a printing apparatus does not hold a color profile supporting a print medium, the printing apparatus is not capable of performing printing in accordance with the colorant amount optimal for the print medium. Thus, a normal printed result cannot be achieved. Consequently, an acceptable colorant amount depending on a print medium must be appropriately set, and a color profile must be generated such that the acceptable colorant amount is not exceeded.

In general, in an image recording apparatus, such as a printer, a maximum colorant amount, which is a printable colorant amount per unit area, depending on a recording medium is defined, and a color separation table (color profile) is prepared such that the maximum colorant amount is not exceeded. This is because some commercially available recording media, such as recording paper, cannot absorb the colorant amount that can be printed per unit area by a commercially available color printer.

For example, when a recording apparatus, such as a printer, prints a color image, Y, M, C, and K colorants are used in a superimposing manner. Thus, the total amount of colorant used tends to be increased. In this case, for an inkjet printer, ink cannot be fully absorbed depending on the ink absorption characteristics of recording paper, and ink overflow or bleeding may occur. Thus, accurate density may not be achievable.

In addition, for an electrophotographic printer using toner, the toner might not adhere to recording paper depending on the toner adhesion characteristics of the recording paper. Thus, accurate density may not be achievable. As a result, even if excellent image reproduction is achieved in image processing for generating colorant data, accurate image reproduction may not be achievable as the actual recorded result.

Under such circumstances, a technique is disclosed in US 2004/0027406 in which in order to achieve printing corresponding to the colorant amount optimal for a print medium even when a color profile supporting the print medium is not held by a printing apparatus, a test pattern for determining an ink ejection amount is generated. For example, a technique is known in which, for calorimetric color separation, a calorimetric patch is generated in consideration of the maximum colorant amount such that the maximum colorant amount is not exceeded and color separation optimal for a printer and recording paper is performed. Thus, a patch is recorded such that excess addition of a colorant, such as ink or toner, does not occur, and an accurate color separation table can be generated.

However, in the method disclosed in US 2004/0027406, since there is no limitation in the range of ink ejection amount used for determination of an acceptable colorant amount, a large number of test patterns must be printed. In addition, since a plurality of various patterns are combined to generate the large number of test patterns, when the determination is performed, technical knowledge about the determination and significant time and effort are required. Thus, when a user who has little technical knowledge of the acceptable colorant amount of a print medium performs printing on a desired print medium whose color profile is not provided, a printed result with an optimal colorant amount cannot be achieved.

SUMMARY OF THE INVENTION

The present invention allows a user who has little technical knowledge of the acceptable colorant amount of a print medium to easily and efficiently determine an appropriate acceptable colorant amount of a print medium whose profile is not provided. In addition, the present invention provides a color separation table generation method and an image processing apparatus that allow a user who has little technical knowledge of a printer to easily perform an operation. Moreover, the present invention provides a color separation table generation method and an information processing apparatus capable of achieving an optimal output to desired paper using a combination of a printer and paper.

An information processing method according to an aspect of the present invention includes an attribute acquisition step of acquiring an attribute of a print medium; a reference information acquisition step of acquiring reference information corresponding to the attribute of the print medium; and an image outputting step of outputting a plurality of images having different total colorant amounts on the basis of the reference information.

An information processing method according to another aspect of the present invention includes an image generating step of generating a plurality of images having different total colorant amounts; and an outputting step of outputting the plurality of images to a printing apparatus. Each of the plurality of images includes printed portions and a gap provided between the printed portions.

An information processing apparatus according to an aspect of the present invention includes an attribute acquisition unit configured to acquire an attribute of a print medium; a reference information acquisition unit configured to acquire reference information corresponding to the attribute of the print medium; and an image outputting unit configured to output a plurality of images having different total colorant amounts on the basis of the reference information.

An information processing apparatus according to another aspect of the present invention includes an image generating unit configured to generate a plurality of images having different total colorant amounts; and an outputting unit configured to output the plurality of images to a printing apparatus. Each of the plurality of images includes printed portions and a gap provided between the printed portions.

An information processing program readable by an information processing apparatus according to an aspect of the present invention includes an attribute acquisition step of acquiring an attribute of a print medium; a reference information acquisition step of acquiring reference information corresponding to the attribute of the print medium; and an image outputting step of outputting a plurality of images having different total colorant amounts on the basis of the reference information.

An information processing program readable by an information processing apparatus according to another aspect of the present invention includes an image generating step of generating a plurality of images having different total colorant amounts; and an outputting step of outputting the plurality of images to a printing apparatus. Each of the plurality of images includes printed portions and a gap provided between the printed portions.

A color separation table generation method according to an aspect of the present invention for generating a color separation table that is used for converting an image signal into a colorant signal representing a colorant used by a printing apparatus and that stores grid point data as the colorant signal in association with a grid point defined by the image signal includes a maximum colorant amount determination chart generation step of outputting a chart used for determining the maximum colorant amount of a recording medium used for recording; a maximum colorant amount acquisition step of receiving input of the maximum colorant amount of the recording medium in accordance with the chart; an existing color separation table selection step of selecting one or more existing color separation tables prepared in advance on the basis of the acquired maximum colorant amount; and a color separation table generation step of generating a new color separation table using the selected one or more existing color separation tables.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 7 is a flowchart showing a process performed by the information processing system according to the second embodiment.

FIG. 8 is a schematic diagram for explaining a method for retrieving an existing LUT in the second embodiment.

FIG. 9 is a schematic diagram for explaining another method for retrieving an existing LUT in the second embodiment.

FIG. 23 shows a list used in the sixth embodiment in which data indicating the presence or absence of existing LUTs is stored.

DESCRIPTION OF THE EMBODIMENTS

Preferred embodiments of the present invention will now be described in detail in accordance with the accompanying drawings. The embodiments described below do not limit the present invention described in the claims. In addition, all the combinations of features explained in the embodiments are not necessary for attaining aspects of the present invention.

First Embodiment

Figure 1:
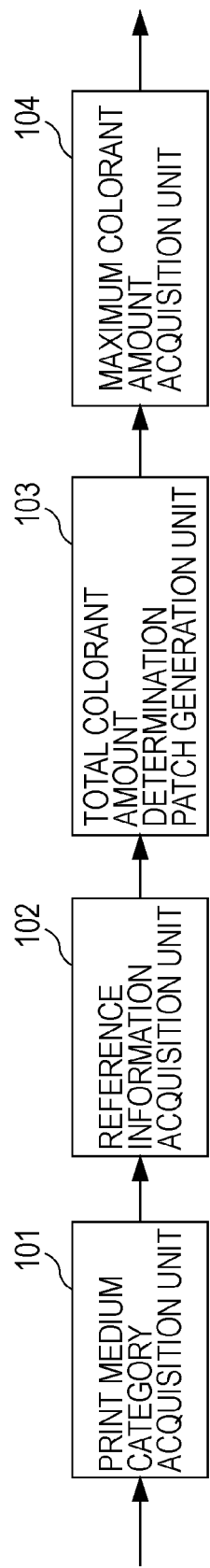
FIG. 1 is a schematic diagram showing an information processing system according to a first embodiment of the present invention.

FIG. 1 shows a configuration of an information processing system using a color printer, which is an example of a printing apparatus according to a first embodiment. In the following description, the maximum colorant amount represents the maximum amount of colorant, such as ink or toner, acceptable by a print medium, such as paper.

The information processing system according to the first embodiment includes a print medium category acquisition unit 101, a reference information acquisition unit 102, a total colorant amount determination patch generation unit 103, and a maximum colorant amount acquisition unit 104. The print medium category acquisition unit 101 acquires a category representing the type of print medium, such as glossy paper, semi-glossy paper, coated paper, or art paper. The reference information acquisition unit 102 acquires reference information, such as a binarization parameter and the maximum colorant amount. The total colorant amount determination patch generation unit 103 outputs a patch, which includes an image, for determining the maximum colorant amount of the print medium. The maximum colorant amount acquisition unit 104 acquires the maximum colorant amount of the print medium using the patch.

Figure 2:
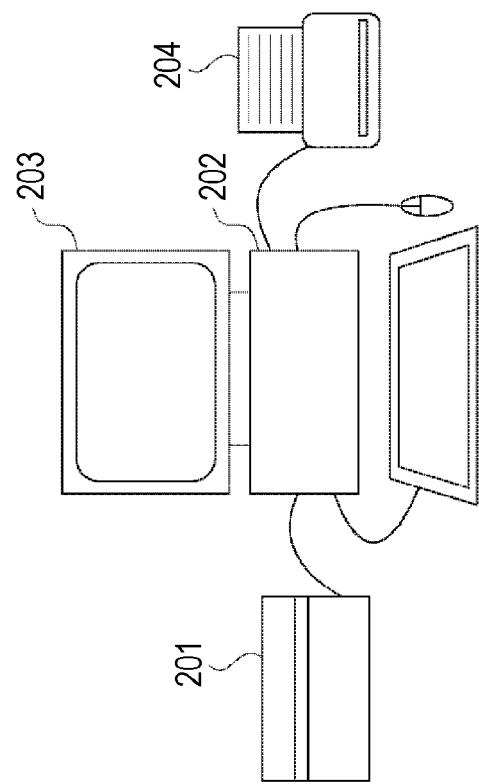
FIG. 2 schematically shows the entire configuration of the information processing system according to the first embodiment.

FIG. 2 shows an example of the entire configuration of the information processing system according to the first embodiment. A scanner 201 serves as an image input apparatus. A computer 202 receives an image read with the scanner 201. The computer 202 is capable of editing and storing the image received from the scanner 201. The computer 202 is also capable of outputting the received image to a display 203 or a printer 204.

Figure 3:
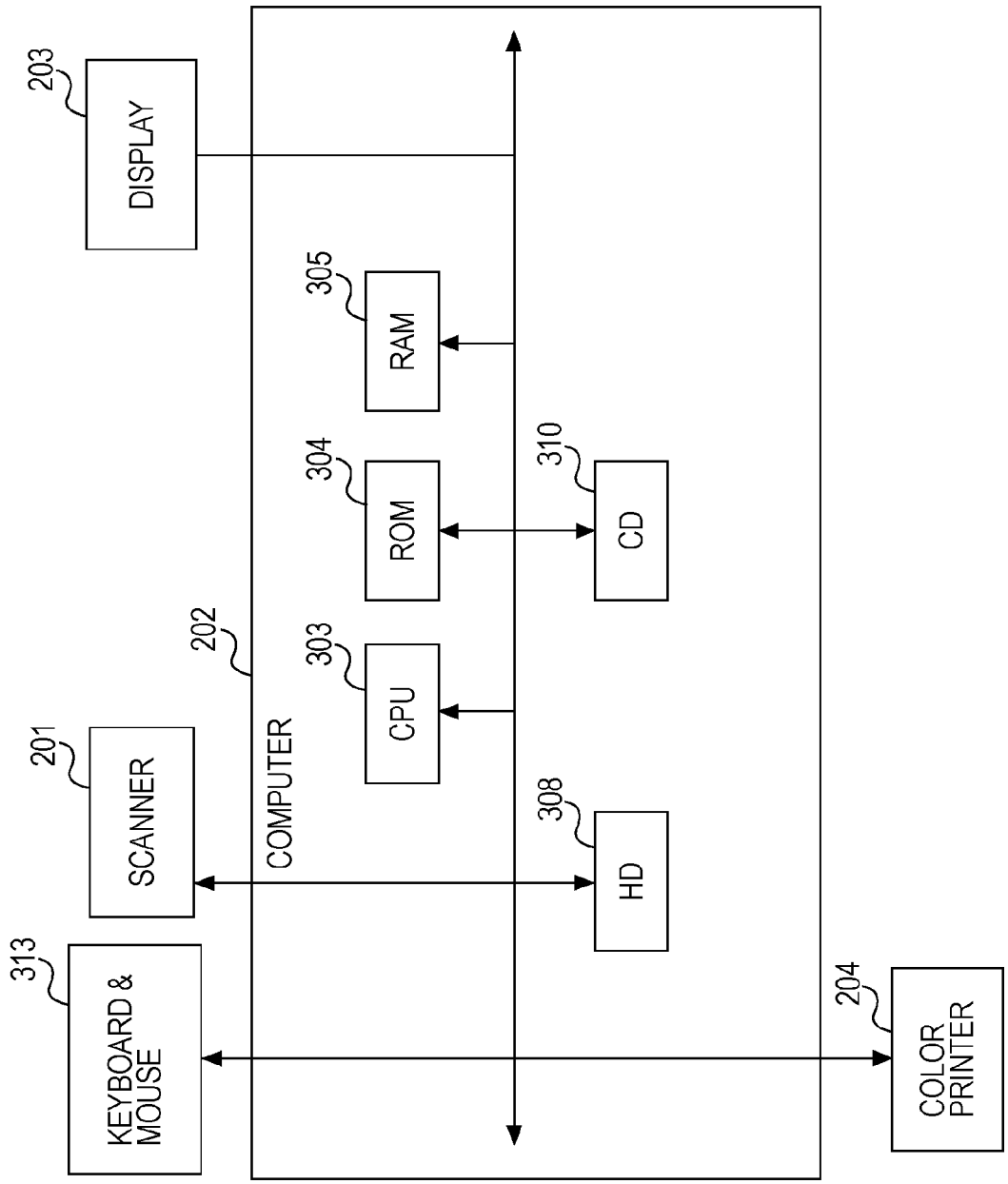
FIG. 3 schematically shows modules of the information processing system shown in FIG. 2.

FIG. 3 is a block diagram showing main portions of the configuration shown in FIG. 2 as functional modules. Modules corresponding to the apparatuses shown in FIG. 2 are denoted by the same reference numerals. Referring to FIG. 3, an input device (a keyboard and a mouse) 313 is used by a user to input various manual instructions. A central processing unit (CPU) 303 is capable of controlling operations of various blocks and executing a program stored inside. A read-only memory (ROM) 304 stores in advance necessary image processing and the like. A random-access memory (RAM) 305 temporarily stores a program and image data to be processed by the CPU 303. A hard disk (HD) 308 stores a program and image data to be transferred to the RAM 305 or the like and processed image data. Data can be read from or written to a compact disc (CD) 310, which is one of external storage media, such as a CD-Recordable (CD-R), a CD-ReWritable (CD-RW), or a digital versatile disc (DVD). When a program for image editing, printer information, or the like is stored in the CD 310 or the like, the program or information is installed into the HD 308 and transferred to the RAM 305 according to need.

Figure 4:
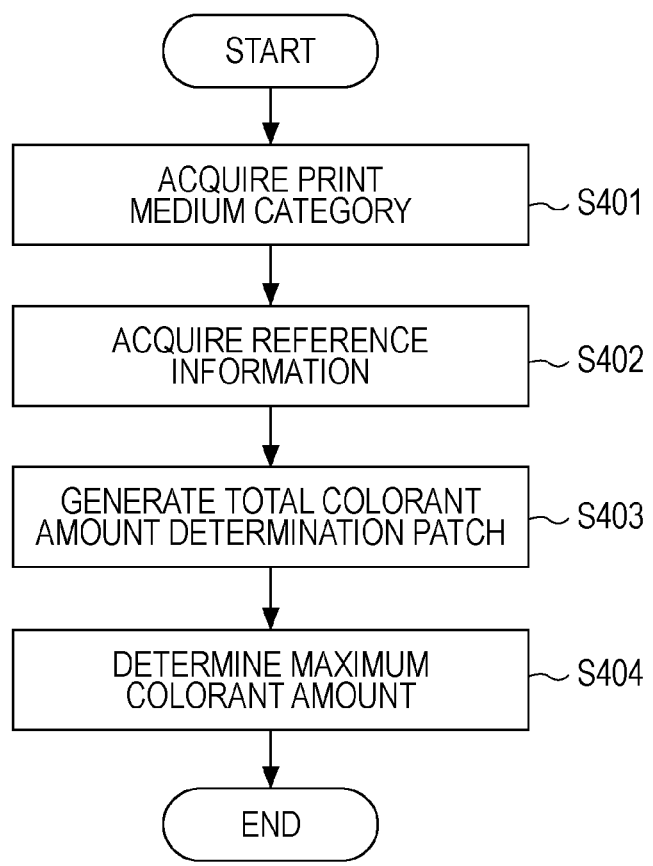
FIG. 4 is a flowchart showing a process performed by the information processing system according to the first embodiment.

FIG. 4 is a flowchart showing a process performed with the configuration shown in FIGS. 2 and 3 in the first embodiment. A computer-executable program in which the process of the flowchart shown in FIG. 4 is described is stored in advance in the ROM 304. Alternatively, an aspect of the present invention is achieved by reading and supplying a program stored in the HD 308 to the RAM 305 and executing the program by the CPU 303.

Figure 11:
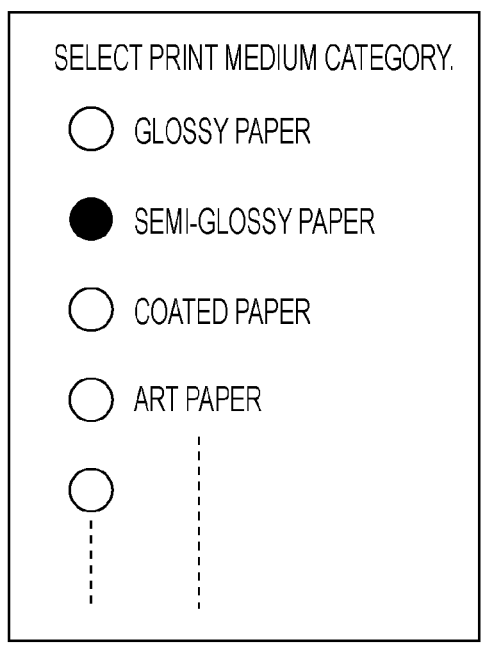
FIG. 11 shows the screen of a user interface used in an embodiment of the present invention.

The process performed in the first embodiment will be described with reference to the flowchart shown in FIG. 4. In step S401, the category of print medium is acquired. In the processing of step S401, using a user interface provided by the program, a user visually judges the category of print medium and selects the category of print medium from a list, for example, as shown in FIG. 11. The acquired print medium category is stored in the RAM 305.

In step S402, driver information of the printer 204 is retrieved on the basis of the print medium category judged in step S401 and apparatus information of the printer 204, which is an output apparatus. Reference information corresponding to the print medium category and the printer 204 is acquired from the retrieved driver information. The acquired reference information is stored in the RAM 305. If the size of the reference information is large, the reference information is stored in the HD 308 or the like.

Figure 5:
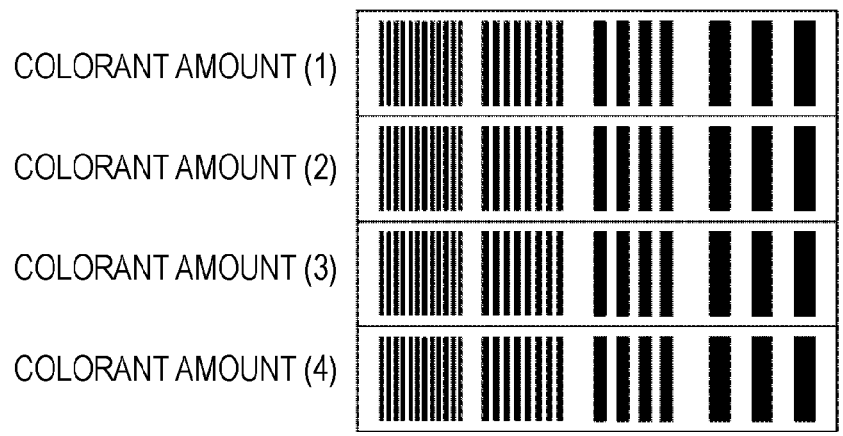
FIG. 5 shows an example of the configuration of a total colorant amount determination patch.
Figure 10:
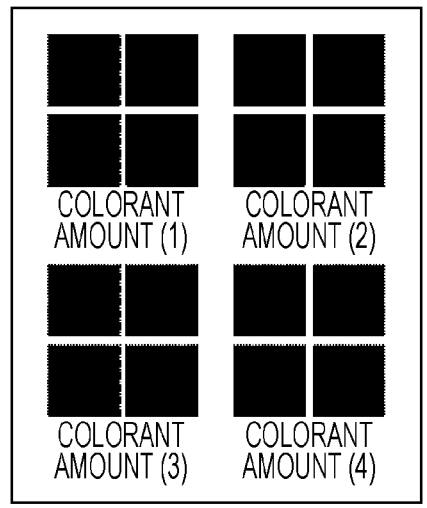
FIG. 10 shows an example of the configuration of a total colorant amount determination patch.

In step S403, a total colorant amount determination patch is generated on the basis of the reference information acquired in step S402, and the printer 204 prints the generated total colorant amount determination patch on a desired print medium. The total colorant amount determination patch includes a plurality of images having stepwisely different total colorant amounts, such as colorant amounts 1 to 4, within a predetermined range, as shown in FIG. 5. In addition, each of the plurality of images includes a plurality of printed areas in which the resolution (the number of lines) is varied such that linear printed portions and gaps, which are non-printed portions, alternately exist in a linear manner. In order to achieve easier determination, printed portions in a printed area have the same resolution. The plurality of images are generated as images indicating a plurality of colorant amounts by equally dividing the predetermined range whose central axis is the maximum colorant amount indicated by the reference information and stepwisely varying colorant amounts using binarization parameters. Since images are generated as a plurality of stepwisely different colorant amounts, comparison can be easily performed, thus achieving easier determination of the maximum colorant amount. The total colorant amount determination patch generated and output here is not necessarily the same as the patch shown in FIG. 5. For example, as shown in FIG. 10, images having stepwisely different total colorant amounts may have cross-shaped non-printed portions. The width of each of a printed portion and a non-printed portion of the patch shown in FIG. 5 or 10 can be set in a desired manner. The width can be set on the basis of the print medium category acquired in step S401 and the reference information acquired in step S402 in accordance with the combination of the print medium category and the type of colorant. For example, for a combination causing large ink bleeding, processing for increasing the sizes of the gaps is performed while the processing resolution of the printer is referred to.

Figure 12:
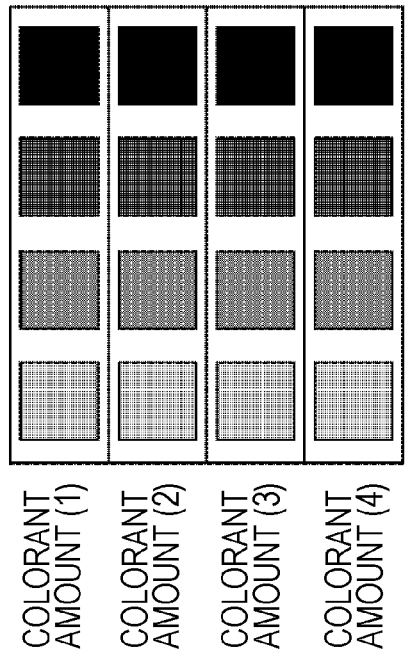
FIG. 12 shows an example of the configuration of a total colorant amount determination patch.

Furthermore, a patch shown in FIG. 12 may be used as a patch for determining the total colorant amount. The patch shown in FIG. 12 is a thickly printed patch (that is, a solid patch) in which different total colorant amounts are output using a combination of a plurality of types of colorant. With the use of the patch shown in FIG. 12, deterioration in the graininess of colorant concentration caused when a print medium cannot accept a colorant can be observed. In combining of colorants when the patch shown in FIG. 12 is output, for example, a colorant with a low acceptance (permeation) speed is preferentially used in accordance with the acceptance (permeation) speed defined based on the combination of a print medium and a colorant. In addition, a combination of colorants may be determined in accordance with reference information for each apparatus type acquired in step S402 including at least one of information on the viscosity of each colorant and information on the acceptance (permeation) speed of each type of print medium.

Figure 13:
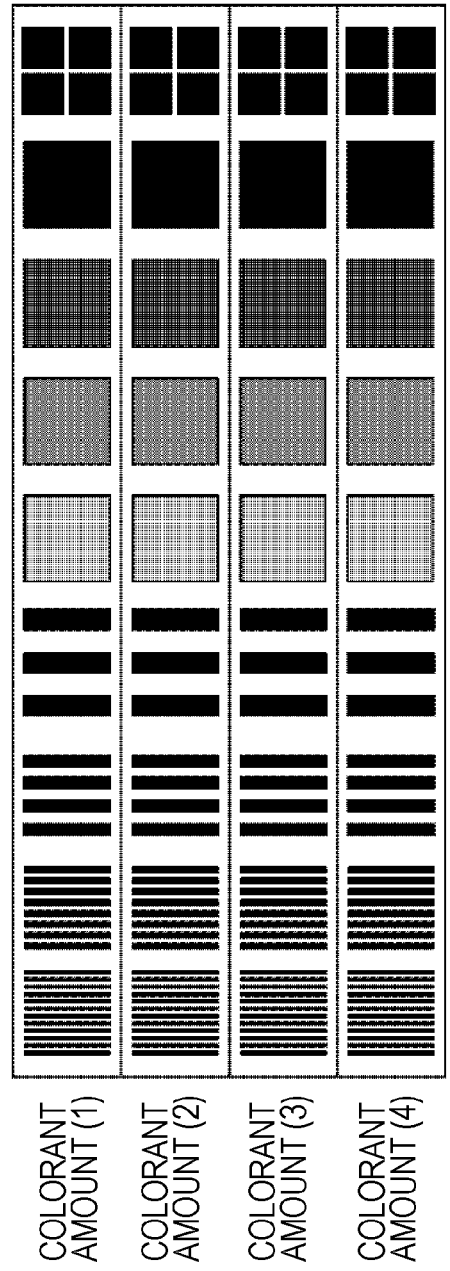
FIG. 13 shows an example of the configuration of a total colorant amount determination patch.

Obviously, for example, an image formed by combining the patches described above may be output, as shown in FIG. 13. The combination or arrangement of the patches may be changed in a desired manner.

In step S404, the maximum colorant amount for the desired print medium is input in accordance with the total colorant amount determination patch output in step S403. The user perceives the maximum colorant amount from the output result, and inputs the maximum colorant amount using the input device (the keyboard and the mouse) 313. The maximum colorant amount will be described using, for example, the patch shown in FIG. 10. The maximum colorant amount is the colorant amount corresponding to an image in which a cross-shaped non-printed portion can be clearly discriminated. In addition, when the maximum colorant amount is input, it is desirable that an indicator indicating the degree of collapse of a cross-shaped image is prepared. In the indicator, the degree of collapse in the case of printing text and the degree of collapse in the case of printing a photograph may be individually prepared.

After the processing of step S404 ends, the series of processing is completed.

With the processing control described above, a user who has little technical knowledge of a printing apparatus is able to easily perform an operation and determine the maximum colorant amount achieving an optimal printed result even for a print medium that is not supported by a driver.

In the first embodiment, in step S401, the user visually judges the category of print medium. However, irrespective of the category of print medium, the attribute of print medium can be acquired by performing measurement using a sensor, such as a glossmeter, a spectral reflectometer, or microscope, which is capable of converting the characteristic of the surface of a print medium into a value. A similar advantage can also be achieved by implementing an aspect of the present invention when the system performs automatic judgment in accordance with the acquired attribute.

In step S402, the reference information is not necessarily acquired from the driver mounted in the computer 202. The reference information may be acquired from an external storage medium, such as the CD 310. In addition, the computer 202 may transmit information on the print medium category acquired in step S401 and apparatus information of the printer 204, which is an output apparatus, and the transmission results may be acquired. Furthermore, the printed images may be not only generated by the computer 202 but also acquired via an external storage medium, such as the CD 310.

In addition, although the total colorant amounts used in step S403 are defined by using the maximum colorant amount as the center of the predetermined range, the central axis of the predetermined range may be shifted in a desired manner. In addition, although four types of total colorant amount are provided in the total colorant amount determination patch in step S403, it is obvious that the total colorant amount determination patch does not necessarily include four types of total colorant amount. In addition, the gaps are not necessarily non-printed portions. The gaps may be portions in which processing not using a colorant has been performed for a print medium.

In addition, the determination as to the maximum colorant amount may be automatically performed in step S404. For example, after the scanner 201 or the like reads the printed patch image and a cross-shaped non-printed portion is extracted, the determination may be automatically performed. In addition, after a sensor, such as a CCD (not shown), mounted in the printer 204 reads the patch shown in FIG. 5, sharpness data for each colorant amount may be generated so that the maximum colorant amount can be automatically determined on the basis of the sharpness data. A criterion for the determination may be changed depending on whether an object to be printed is text or a photograph. For example, different resolution thresholds may be provided for text and a photograph. Alternatively, estimation resolution may be changed depending on the text or photograph. The use of an appropriately changed determination criterion enables determination of an optimal maximum colorant amount for each image.

In addition, for the thickly printed (solid) patch using the combination of colorants shown in FIG. 12, an operator may input the sense of graininess when the operator views the patch as the graininess of colorant concentration. Alternatively, the graininess in the image captured with the scanner or the CCD sensor may be calculated so that it can be determined whether or not a predetermined threshold is exceeded.

Second Embodiment

In the first embodiment, the series of processing is completed after the maximum colorant amount is determined in step S404. In a second embodiment, the reference information acquired in step S402 includes an existing color separation lookup table (LUT), and a process to generate a color separation LUT on the basis of the maximum colorant amount determined in step S404 is added.

Figure 6:
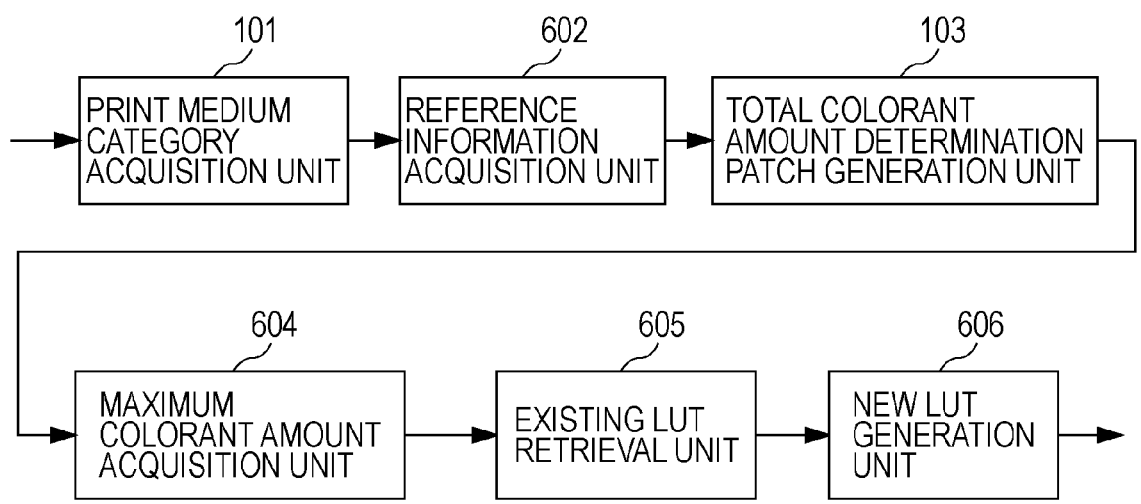
FIG. 6 is a schematic diagram showing an information processing system according to a second embodiment of the present invention.

A configuration of a color separation LUT correction system used in a color printer according to the second embodiment will be described with reference to FIG. 6. Only portions different from the first embodiment will be explained. A reference information acquisition unit 602 acquires a color separation LUT as well as the reference information described in the first embodiment. An existing LUT retrieval unit 605 retrieves, from among acquired color separation LUTs, an LUT that can be used for generating an optimal color separation LUT so as not to exceed the maximum colorant amount acquired by a maximum colorant amount acquisition unit 604. A new LUT generation unit 606 generates a new LUT on the basis of the LUT retrieved by the existing LUT retrieval unit 605.

A process performed by the color separation LUT correction system in the color printer according to the second embodiment will be described with reference to a flowchart shown in FIG. 7. Only portions different from the first embodiment will be explained.

In step S705, on the basis of the maximum colorant amount determined in step S404, one or two existing LUTs having total colorant amounts equal to or close to the maximum colorant amount are retrieved. The retrieval processing will be described with reference to FIGS. 8 and 9. Referring to FIG. 8, in a driver mounted in the computer 202, for example, an LUT having a total colorant amount of 180 exists and an LUT having a total colorant amount of 200 does not exist. For example, when the maximum colorant amount input in step S404 is "220", an LUT for "220" is retrieved. For example, when the maximum colorant amount input in step S404 is "210", one or both of an LUT for "200" and an LUT for "220" are retrieved. For example, when the maximum colorant amount input in step S404 is "250", an LUT for "240" is retrieved. Here, a total colorant amount of 200 is an indicator when the maximum printable amount of each colorant is represented as 100. The total colorant amount is not necessarily represented as described above. The total colorant amount may be represented in any way as long as it represents the total sum of the maximum printable amounts of colorants.

Referring to FIG. 9, for example, when a print medium is glossy paper, an LUT of a total colorant amount of 180 does not exist and an LUT of a total colorant amount of 200 exists. Information on the retrieved LUTs is stored in the ROM 304. If the size of the information is large, the information is stored in the HD 308 or the like.

In step S706, on the basis of the LUTs retrieved in step S705, an LUT optimal for the print medium used for output in step S703 is generated. When two types of LUTs are retrieved in step S705, interpolation processing is performed in accordance with the maximum colorant amounts of the existing LUTs and the maximum colorant amount of the print medium input in step S404. If an LUT is retrieved in step S705, 1× magnification of the LUT is performed. The processed LUT is set so as to be used by a printer driver, and stored in the ROM 304 or the HD 308. Then, the process is terminated. After the processing of step S706 ends, the series of processing is completed.

As described above, a user who has little technical knowledge of a printing apparatus is able to easily perform an operation and determine the maximum colorant amount achieving an optimal printed result for a print medium that is not supported by a driver.

An advantage of an aspect of the present invention can also be achieved when an existing LUT is distributed as an external storage medium, such as the CD 310, acquired via a network (not shown), or distributed as an external storage medium via a network.

Third Embodiment

All the processing is performed by the local computer 202 in the first and second embodiments. However, the processing may be performed by a host computer and a local computer in a shared manner.

A third embodiment will be described with reference to the flowchart shown in FIG. 7, which has been explained in the second embodiment.

A configuration may be adopted in which a local computer performs inputting of a print medium category, which is the processing of step S401, printing of a patch, which is part of the processing of step S403, and inputting the maximum colorant amount, which is the processing of step S404, and a host computer performs the other processing. In this case, the host computer can communicate with the local computer using a communication network, such as the Internet. After each of the processing is performed, a generated LUT can be set in the local computer 202.

Fourth Embodiment

Figure 14:
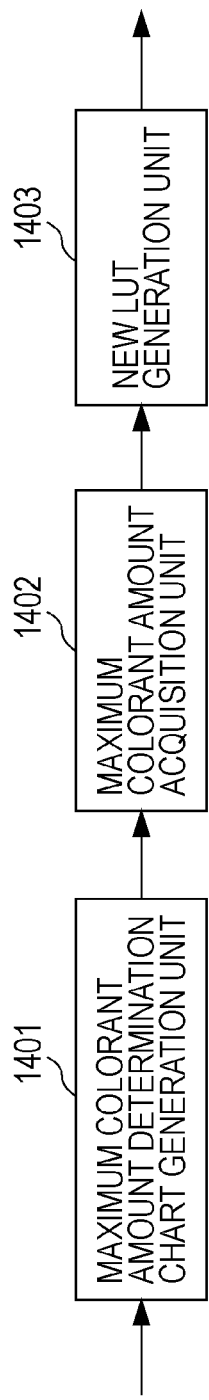
FIG. 14 is a block diagram showing a color separation image processing configuration according to a fourth embodiment of the present invention.

FIG. 14 is a block diagram showing an image processing configuration of a color printer according to a fourth embodiment of the present invention. FIG. 14 shows a process to generate a color separation table (LUT) in accordance with a result of the determination as to the maximum colorant amount. The color separation table is used in processing for converting a color signal representing image data into a color signal representing a colorant, such as ink or toner, used in a recording apparatus, such as a color printer. In the color separation table, for example, ink values (ink amounts) of yellow (Y), magenta (M), cyan (C), and black (K), which are color signals representing ink, are stored as grid point data at grid points defined by the values of R, G, and B color signals.

This configuration shows processing performed by, for example, a printer driver of a host computer, as described below. However, the processing may be performed by an image output apparatus, such as a printer, or may be performed by the host apparatus and the image output apparatus in a shared manner. An aspect of the present invention is applicable to any case.

Referring to FIG. 14, in the process to generate an LUT (hereinafter, referred to as a color separation process), a maximum colorant amount determination chart generation unit 1401 outputs a chart for determining the maximum colorant amount of a desired recording medium. A maximum colorant amount acquisition unit 1402 acquires the maximum colorant amount of the desired recording medium using the chart. In accordance with the recording medium and the maximum colorant amount, a new LUT generation unit 1403 generates a new LUT while referring to at least one existing LUT of the recording medium.

Figure 15:
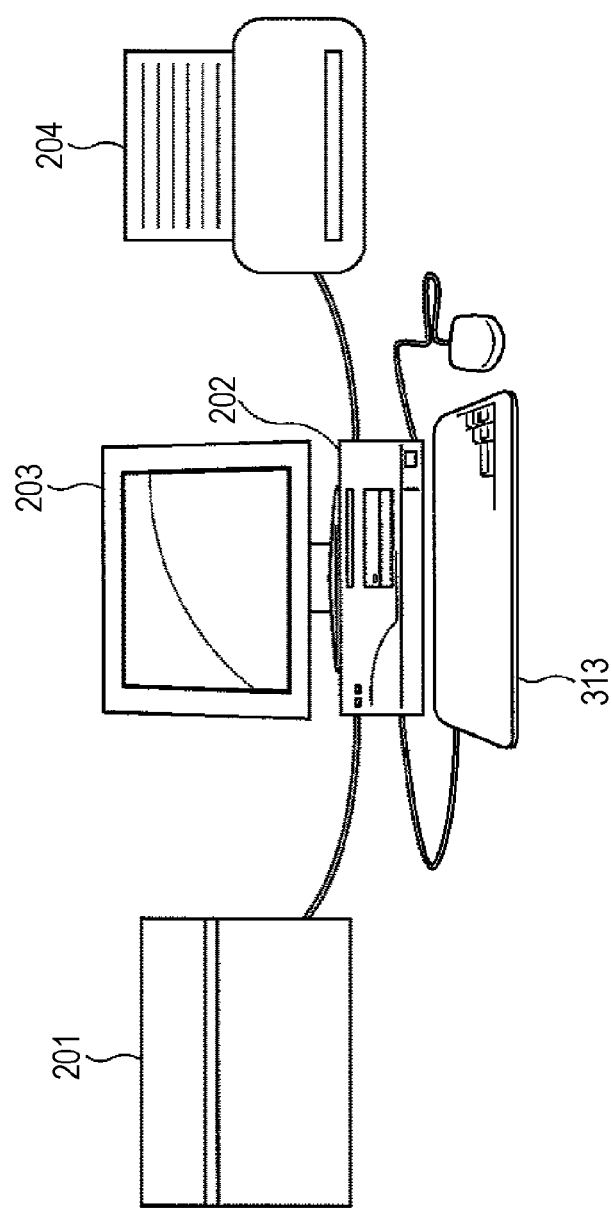
FIG. 15 shows an image system according to the fourth embodiment.

FIG. 15 shows a specific image processing system that performs the above-mentioned image processing.

Referring to FIG. 15, the scanner 201 serves as an image signal input apparatus. The personal computer 202 is capable of receiving, editing, and storing an image signal read with the scanner 201. Image signal information that has been subjected to editing or the like can be displayed on the display 203 or printed out by the printer 204 serving as an image output apparatus. The input device (the keyboard and the mouse) 313 is used by a user to input instructions for processing or controlling of the computer 202.

Figure 16:
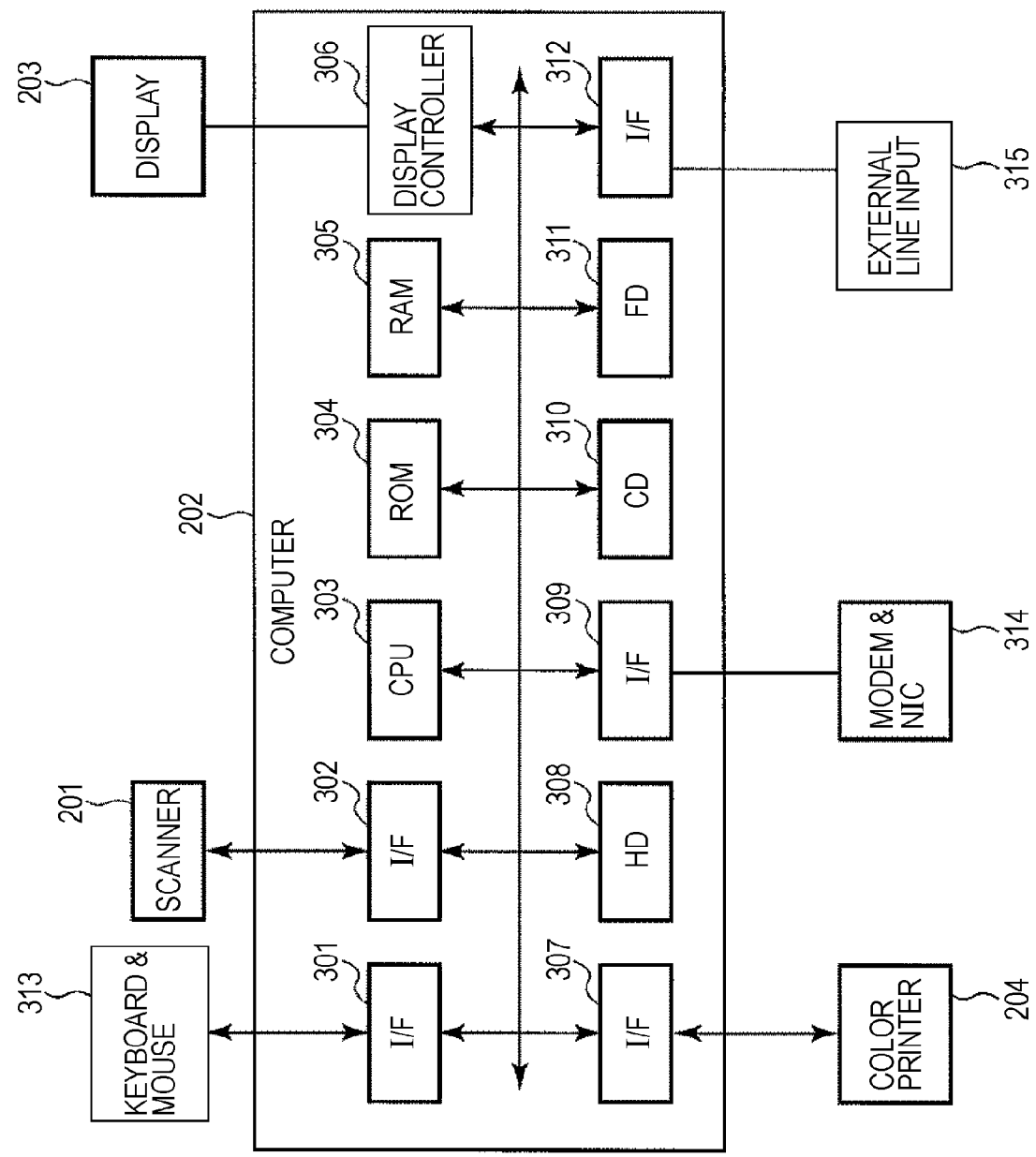
FIG. 16 shows main units of the image system shown in FIG. 15.

FIG. 16 is a block diagram particularly showing main components of the computer 202 in the system shown in FIG. 15.

Referring to FIG. 16, an interface (I/F) 301 is used for transfer of signals to and from the input device (the keyboard and the mouse) 313, and an interface (I/F) 302 is provided for the image input apparatus, such as the scanner 201.

The CPU 303 controls processing and operation of each unit of the computer 202 in accordance with a program and performs predetermined processing. The ROM 304 stores the image processing or the like described below. The RAM 305 temporarily stores a program or image data during the execution of the above-mentioned processing performed by the CPU 303.

A display controller 306 controls the display 203 that displays an image to be processed and a message to be presented to an operator. An interface (I/F) 307 allows signal connection between the computer 202 and the printer 204. The HD 308 stores a program and image data to be transferred to and used by the RAM 305 or the like and processed image data. An interface (I/F) 309 allows signal connection between a transmission apparatus (a modem & a network interface card (NIC)) 314 and the computer 202. As the transmission apparatus 314, a modem and a network card that are capable of, for example, transmitting various data stored in units of the computer 202 to an external apparatus and receiving various data from the external apparatus are used. Data can be read from and written to the CD 310 (for example, a CD-R, a CD-ROM, and a DVD), which is one of external storage media. Similarly, data can be read from and written to a flexible disk (FD) 311. When a program for image editing, printer information, or the like is stored in the CD 310, the FD 311, a DVD, or the like, the program or information is installed into the HD 308 and transferred to the RAM 305 according to need. A sound interface (I/F) 312 is connected to an external line input 315 and a microphone (not shown) and is used for receiving sound data from the outside.

Figure 17:
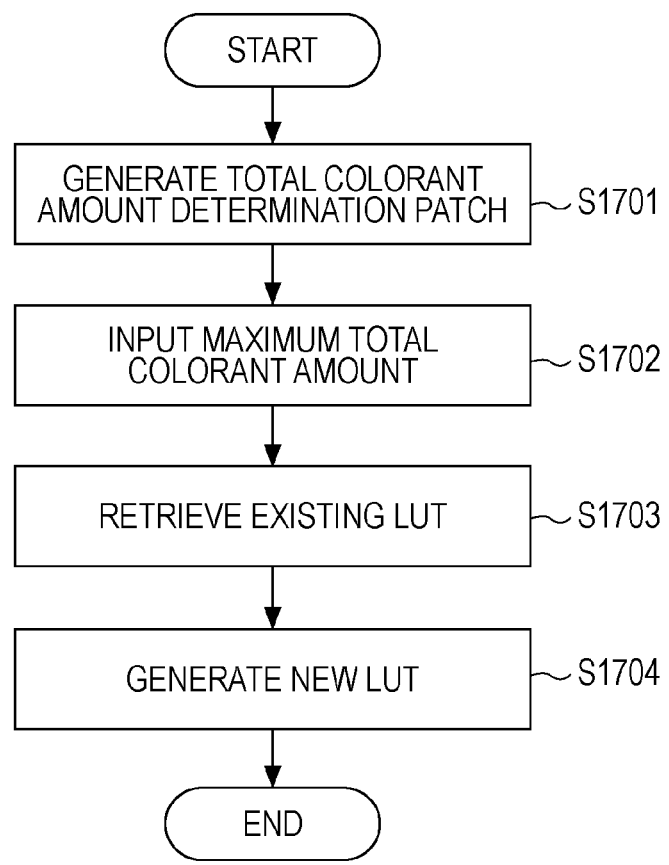
FIG. 17 is a flowchart showing a color separation image process performed in the fourth embodiment.

FIG. 17 is a flowchart of the color separation process shown in FIG. 14, more specifically, a process to generate a color separation table performed with the configuration shown in FIGS. 15 and 16. A computer-executable program in which the flowchart shown in FIG. 17 is described may be stored in advance in the ROM 304. Alternatively, after the program stored in advance in the HD 308 is read and supplied to the RAM 305, the CPU 303 may execute the program.

The process according to the fourth embodiment will be described with reference to the flowchart shown in FIG. 17.

In step S1701, a total colorant amount determination patch is generated, and the generated total colorant amount determination patch is output to a desired recording medium by the printer 204 through the interface (I/F) 307, which allows connection between the computer 202 and the printer 204.

Figure 18:
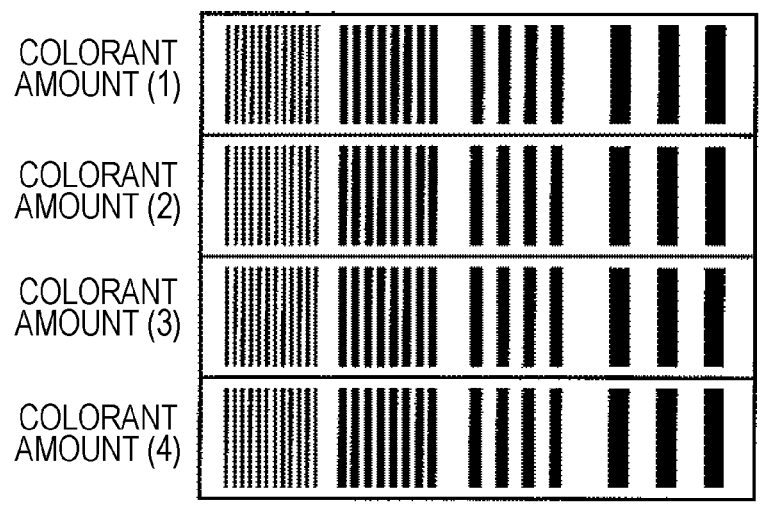
FIG. 18 shows an example of a patch used in the fourth embodiment.
Figure 19:
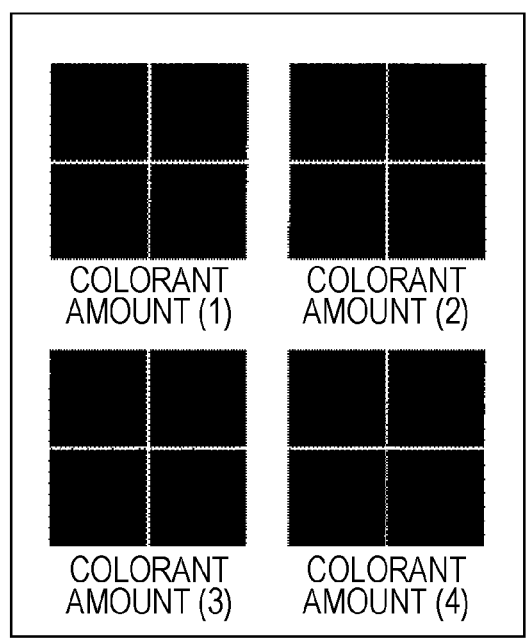
FIG. 19 shows another example of the patch used in the fourth embodiment.

FIGS. 18 and 19 show examples of the total colorant amount determination patch. The total colorant amount determination patch shown in FIG. 18 includes a plurality of images having a predetermined range of levels of total colorant amount. In each of the plurality of images, recorded portions having different resolutions (the numbers of lines) and non-recorded portions alternately exist in a linear manner. The total colorant amount determination patch shown in FIG. 19 includes a plurality of images having a predetermined range of levels of total colorant amount. Each of the plurality of images includes a cross-shaped non-recorded portion. The total colorant determination patch is not necessarily configured as shown in FIG. 18 or FIG. 19. Any type of total colorant amount determination patch can be used as long as an image includes a recorded portion and a non-recorded portion that are adjacent to each other. Although four types of total colorant amount are shown in FIGS. 18 and 19, two or three types of total colorant amount or five or more types of total colorant amount can be used. In addition, the recorded images are not necessarily generated by the computer 202. The recorded images may be acquired via an external storage medium, such as the CD 310 or the FD 311, or the transmission apparatus 314.

After the images are recorded, the process proceeds to step S1702.

In step S1702, in accordance with the total colorant amount determination patch output in step S1701, the maximum total colorant amount for the desired recording medium is input. Concerning the maximum total colorant amount, for example, in accordance with the total colorant amount determination patch shown in FIG. 19, the user perceives a threshold for clearly discriminating a cross-shaped non-recorded portion and inputs the threshold using the input device (the keyboard and the mouse) 313. The maximum total colorant amount may be directly input or a value or a sign defined for each patch may be input.

When the maximum total colorant amount is input, it is desirable that an indicator indicating the degree of collapse of a cross-shaped portion is prepared. In the indicator, the degree of collapse in the case of recording text and the degree of collapse in the case of recording a photograph may be individually prepared. The input maximum total colorant amount is stored in the ROM 304.

In step S1703, on the basis of the maximum total colorant amount input in step S1702, one or two existing LUTs having total colorant amounts equal to or close to the maximum total colorant amount are retrieved.

Figures 20, 21:
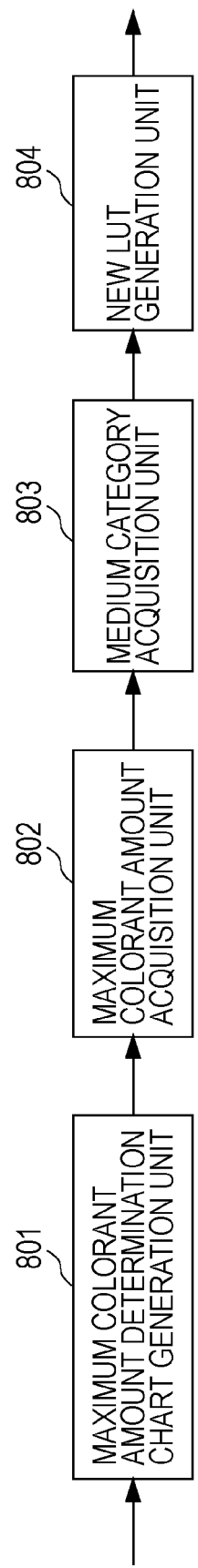
FIG. 20 shows a list used in the fourth embodiment in which data indicating the presence or absence of existing LUTs is stored.
FIG. 21 is a block diagram showing a color separation image processing configuration according to a sixth embodiment of the present invention.

FIG. 20 shows a list in which data indicating the presence or absence of existing LUTs (existing color separation tables) prepared in advance is stored. For example, an existing LUT exists in a driver incorporated in the computer 202 and can be distributed as an external storage medium, such as the CD 310 or the FD 311, or can be acquired via the transmission apparatus 314. Alternatively, the existing LUT may be distributed as an external storage medium via the transmission apparatus 314.

Referring to FIG. 20, as existing LUTs, for example, a table for a maximum colorant amount of 180 does not exist in the storage medium or the like, and a table for a maximum colorant amount of 200 exists. When the maximum total colorant amount input in step S1702 is "200", "220", or "240", since an existing LUT for a corresponding maximum total colorant amount exists, the corresponding existing LUT is retrieved. In contrast, when the maximum total colorant amount "180" or "260" is input or a value corresponding to the input total colorant amount does not exist in the list shown in FIG. 20, since a corresponding existing LUT does not exist, one or more available LUTs are retrieved. For example, an existing LUT corresponding to the total colorant amount that is the closest to the input value or two LUTs corresponding to the total colorant amounts sandwiching the input value are retrieved. Information of the retrieved LUTs is stored in the ROM 304 or the HD 308. It is determined in advance whether one LUT is to be retrieved or two LUTs are to be retrieved in accordance with, for example, the specification of the color separation system.

In step S1704, on the basis of the LUTs retrieved in step S1703, an LUT optimal for the desired recording medium used for the outputting in step S1701 is generated. When two types of LUT are retrieved in step S1703, the generation of the LUT is performed by interpolation based on the maximum colorant amounts corresponding to the retrieved LUTs. For example, interpolation is performed using the maximum colorant amounts of the retrieved existing LUTs and the maximum colorant amount of the desired recording medium, which is input in step S1702. That is, a difference between the total colorant amount corresponding to each of the retrieved LUTs and the input total colorant amount is used as a ratio of internal interpolation, and grid point data of a new LUT is acquired by performing interpolation at the ratio using corresponding grid point data of grid points at the same positions.

When an LUT is retrieved in step S1703, coefficient multiplication is performed by 1× multiplication of grid point data of the retrieved LUT at the ratio of the input maximum colorant amount to the total colorant amount of the retrieved LUT. The acquired LUT is stored in the ROM 304 or the HD 308 and set such that the LUT can be used by the printer driver after the process is terminated.

After the processing of step S1704 ends, the series of processing is completed.

Fifth Embodiment

Although the user determines and inputs the maximum total colorant amount in step S1702 in the fourth embodiment, the determination is not necessarily performed by the user.

Obviously, the determination in step S1702 may be automatically performed. For example, after the scanner 201 or the like reads the recorded patch image shown in FIG. 19 and the cross-shaped non-recorded portion is extracted, the determination may be automatically performed. In addition, after a CCD or the like mounted in the printer 204 reads the patch shown in FIG. 18, sharpness data for each colorant amount may be generated so that the maximum colorant amount can be automatically determined on the basis of the sharpness data. A criterion for the determination may be changed depending on whether an object to be recorded is text or a photograph. For example, different resolution thresholds may be provided for text and a photograph.

Sixth Embodiment

Although input information on a desired recording medium is only data of the maximum colorant amount in the foregoing embodiments, the information is not necessarily data of the maximum colorant amount.

FIG. 21 is a block diagram showing a color separation image processing configuration according to a sixth embodiment. In a color separation process according to the sixth embodiment, a maximum colorant amount determination chart generation unit 801 outputs a chart for determining the maximum colorant amount for a recording medium selected by a medium category acquisition unit 803. A maximum colorant amount acquisition unit 802 acquires the maximum colorant amount of a desired recording medium using the chart. Then, the medium category acquisition unit 803 acquires the category of the recording medium from among, for example, glossy paper, semi-glossy paper, and coated paper. On the basis of the acquired recording medium category and the maximum colorant amount, a new LUT generation unit 804 generates a new LUT while referring to at least one existing LUT of the recording medium.

Figure 22:
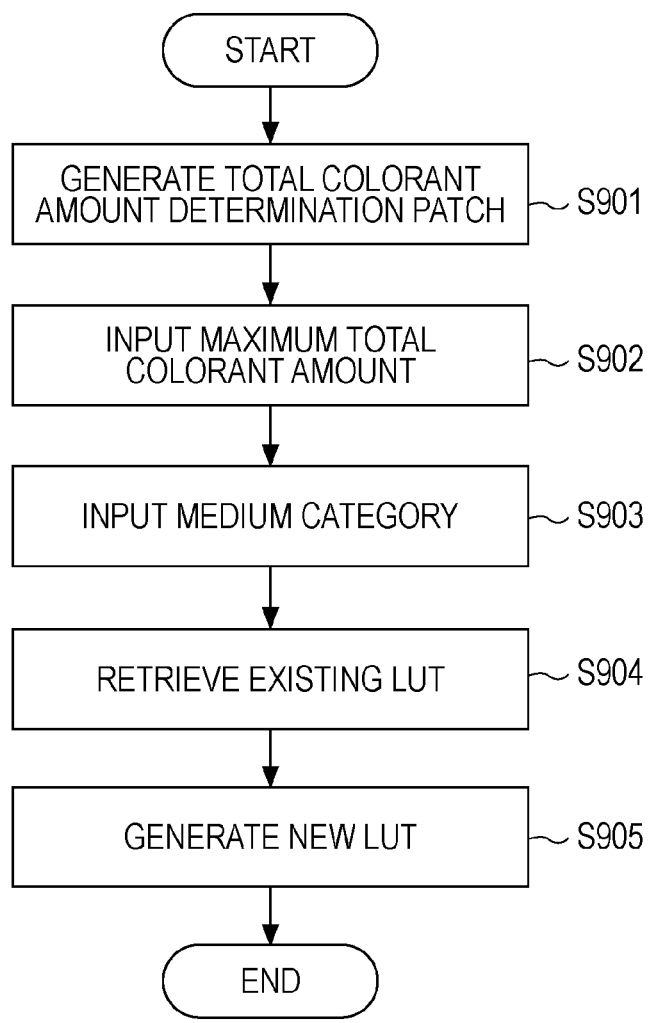
FIG. 22 is a flowchart showing a color separation image process performed in the sixth embodiment.

FIG. 22 is a flowchart of the color separation process shown in FIG. 21. The processing in steps S901 and S902 is similar to the processing of step S1701 and S1702 shown in FIG. 17 explained in the fourth embodiment.

In step S903, the category of recording medium is input. The category of the recording medium may be manually input by the user or may be automatically input in accordance with a measurement value when a specular glossmeter or a goniophotometer is provided. Category data of the recording medium is stored in the ROM 304. Then, the process proceeds to step S904.

In step S904, on the basis of the maximum total colorant amount input in step S902, one or two existing LUTs having total colorant amounts equal to or close to the input maximum total colorant amount are retrieved.

FIG. 23 shows a list in which data indicating the presence or absence of existing LUTs is stored. For example, an existing LUT exists in a driver incorporated in the computer 202 and can be distributed as an external storage medium, such as the CD 310 or the FD 311, or can be acquired via the transmission apparatus 314. Alternatively, the existing LUT may be distributed as an external storage medium via the transmission apparatus 314.

Unlike the list shown in FIG. 20 explained in the fourth embodiment, the list shown in FIG. 23 shows the presence or absence of LUTs for total colorant amounts and recording media. Similarly to retrieval of existing LUTs described in the first embodiment, one or more existing LUTs are retrieved. The retrieved LUTs are stored in the ROM 304 or the HD 308.

Then, in step S905, on the basis of the retrieved LUTs, a new LUT is generated.

Other Embodiments

The present invention is not limited to apparatuses or methods for realizing the foregoing embodiments of the present invention.

The functions of the foregoing embodiments may be realized by software. In this case, a storage medium (or a recording medium) on which program code of software is recorded is supplied to a system or an apparatus. The program code stored in the storage medium is read and executed by a computer (or a CPU or a microprocessing unit (MPU)) of the system or the apparatus. When an aspect of the present invention is applied to the storage medium, program code corresponding to the flowchart shown in FIG. 4, 7, 17, or 22 is stored in the storage medium.

In addition, the program code stored in the storage medium is read and the foregoing embodiments are executed by executing part or all of the actual processing by an operating system (OS) running on the computer.

Furthermore, the program code may be written to a memory arranged in a function expansion board inserted in the computer or a function expansion unit connected to the computer. The functions of the foregoing embodiments can also be attained by performing part or all of the actual processing by the CPU or the like arranged in the function expansion board or the function expansion unit on the basis of instructions of the program code.

A plurality of the above-mentioned methods may be combined.

As many apparently widely different embodiments of the present invention can be made without departing from the spirit and scope thereof, it is to be understood that the invention is not limited to the specific embodiments thereof except as defined in the appended claims.

According to an aspect of the present invention, even a user who has little technical knowledge about an acceptable colorant amount of a print medium is able to easily and efficiently determine an appropriate acceptable colorant amount of a print medium whose profile is not provided.

According to an aspect of the present invention, even when recording is performed using a desired recording medium that is not supported by a drive in a default condition, optimal recording can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-215857 filed Aug. 8, 2006 and No. 2006-324481 filed Nov. 30, 2006, which are hereby incorporated by reference herein in their entirety.

What is claimed is:

1. An information processing method comprising:
an attribute acquisition step of acquiring an attribute of a target print medium;
a reference information acquisition step of acquiring a reference total colorant amount, which corresponds to the acquired attribute and is a maximum colorant amount for another existing print medium and is not a maximum colorant amount for the target print medium, for the target print medium;
an image generating step of generating a plurality of image data having stepwise different total colorant amounts on the basis of the acquired reference total colorant amount to determine the maximum colorant amount for the target print medium;
a printing step of printing a plurality of images corresponding to the generated plurality of image data on the target print medium; and
a maximum colorant amount determining step of determining the maximum colorant amount for the target print medium based on the plurality of images printed in the print step,
wherein the determined maximum colorant amount corresponds to a maximum printable amount of colorant per unit area for the target print medium, and
wherein the different total colorant amounts are within a range centering on the acquired reference total colorant amount.

2. The information processing method according to claim 1, wherein the attribute of the target print medium includes a category of the target print medium.

3. The information processing method according to claim 2, wherein the category includes at least one of glossy paper, semi-glossy paper, coated paper, and art paper.

4. The information processing method according to claim 1, wherein the total colorant amount differs depending on the attribute of the target print medium.

5. The information processing method according to claim 1, wherein the reference total colorant amount includes an acceptable colorant amount corresponding to the attribute of the target print medium.

6. The information processing method according to claim 1, wherein different colorants are used for printing on the plurality of images on the target print medium.

7. The information processing method according to claim 1, wherein each of the plurality of images includes printed portions and a gap provided between the printed portions.

8. The information processing method according to claim 7, wherein the gap is a non-printed portion.

9. The information processing method according to claim 7, wherein the width of the gap can be set in a desired manner.

10. The information processing method according to claim 7, wherein the width of the gap is set on the basis of the combination of the attribute of the target print medium and the type of colorant used for printing the plurality of images.

11. The information processing method according to claim 7, wherein in the image outputting step, the plurality of images each including linear printed portions having different resolutions are generated.

12. The information processing method according to claim 1, wherein the plurality of images are thickly printed images used for measuring the graininess of colorant concentration.

13. The information processing method according to claim 12, wherein the thickly printed images include a plurality of images that differ depending on the combination of the attribute of the target print medium and a colorant used for printing the thickly printed images.

14. An information processing apparatus comprising:
an attribute acquisition unit configured to acquire an attribute of a target print medium;
a reference information acquisition unit configured to acquire a reference total colorant amount, which corresponds to the acquired attribute and is a maximum colorant amount for another existing print medium and is not a maximum colorant amount for the target print medium; and
an image generating unit configured to generate a plurality of image data having stepwise different total colorant amounts to determine the maximum colorant amount for the target print medium on the basis of the reference total colorant amount;
a print unit configured to print a plurality of images corresponding to the generated plurality of image data on the target print medium; and
a maximum colorant amount determining unit configured to determine a maximum colorant amount for the target print medium based on the plurality of images printed by the print unit,
wherein the determined maximum colorant amount corresponds to a maximum printable amount of colorant per unit area for the target print medium, and
wherein the different total colorant amounts are within a range centering on the acquired reference total colorant amount.

15. A non-transitory recording medium recording an information processing program readable by an information processing apparatus, comprising:
an attribute acquisition step of acquiring an attribute of a target print medium;
a reference information acquisition step of acquiring reference total colorant amount, which corresponds to the acquired attribute and is a maximum colorant amount for another existing print medium and is not a maximum colorant amount for target print medium, for the target print medium;
an image generating step of generating a plurality of image data having stepwise different total colorant amounts to determine the maximum colorant amount from the target print medium;
a printing step of printing a plurality of images corresponding to the generated plurality of image data on the target print medium; and
a maximum colorant amount determining step of determining the maximum colorant amount for the target print medium based on the plurality of images printed in the printing step,
wherein the determined maximum colorant amount corresponds to a maximum printable amount of colorant per unit area for the target print medium,
wherein the different total colorant amounts are within a range centering on the acquired reference total colorant amount.

* * * * *